(12) United States Patent
Bowden et al.

(10) Patent No.: US 9,179,810 B2
(45) Date of Patent: Nov. 10, 2015

(54) INSERT WALL ANCHOR FOR A GRAB BAR

(75) Inventors: Rohn Bowden, Greensboro, NC (US); Earl David Forrest, Asheboro, NC (US); Andrew James Graff, Greensboro, NC (US)

(73) Assignee: Liberty Hardware Mfg. Corp., Winston-Salem, NC (US)

( * ) Notice: Subject to any disclaimer, the term of this patent is extended or adjusted under 35 U.S.C. 154(b) by 2366 days.

(21) Appl. No.: 12/036,369

(22) Filed: Feb. 25, 2008

(65) Prior Publication Data

US 2009/0214318 A1    Aug. 27, 2009

(51) Int. Cl.
*F16B 13/10* (2006.01)
*A47K 17/02* (2006.01)

(52) U.S. Cl.
CPC .......... *A47K 17/022* (2013.01); *A47K 2201/025* (2013.01); *F16B 2013/105* (2013.01); *Y10T 29/53* (2015.01)

(58) Field of Classification Search
USPC .......... 411/340, 341, 342, 343, 344, 345, 346, 411/84, 85
See application file for complete search history.

(56) References Cited

U.S. PATENT DOCUMENTS

| | | | | | |
|---|---|---|---|---|---|
| 1,344,720 | A | * | 6/1920 | Royer et al. | 411/345 |
| 1,694,494 | A | * | 12/1928 | Tomkinson | 411/342 |
| 2,519,511 | A | * | 8/1950 | Stelter | 411/342 |
| 2,532,040 | A | * | 11/1950 | Seely | 411/345 |
| 3,513,746 | A | * | 5/1970 | Forsberg | 411/346 |
| 4,810,146 | A | * | 3/1989 | Sinclair | 411/342 |
| 6,644,903 | B1 | * | 11/2003 | Arand | 411/352 |

* cited by examiner

*Primary Examiner* — Flemming Saether
(74) *Attorney, Agent, or Firm* — Carlson, Gaskey & Olds, P.C.

(57) ABSTRACT

A grab bar is attached to a wall with at least one anchor assembly. The anchor assembly can be removed and repeatedly used as needed. The anchor assembly includes a vertical support beam, a flange arm assembly having a base portion and an arm portion, and a spring. The spring is attached to the vertical support beam and cooperates with the arm portion to hold the flange arm assembly in place during installation. The base portion of the flange arm assembly has a flange that fits against a wall surface of the wall structure, and the arm portion is received within a slot formed within the vertical support beam. The flange prevents the flange arm assembly from falling behind the wall structure.

18 Claims, 3 Drawing Sheets

INSERT WALL ANCHOR FOR A GRAB BAR

TECHNICAL FIELD

This invention relates to a bar that is utilized in bathrooms, such as a grab bar for example, and more specifically the invention relates to an insert wall anchor used to secure the grab bar to a wall.

BACKGROUND OF THE INVENTION

Grab bars are utilized in bathroom applications to provide support for an individual during exit or entry in a bathtub or shower, for example. Typical grab bars include a body member that is spaced apart from, and parallel to, a wall. The grab bar has end mounts that extend toward the wall such that the grab bar can be mounted to the wall. Anchor assemblies are mounted to a wall structure that forms the shower enclosure or tub surround, and the end mounts of the grab bar are then attached to the anchor assemblies.

Behind the wall structure is a plurality of studs that extend in a vertical direction from a floor to a ceiling. SHEETROCK® panels, e.g. drywall or wallboard panels, are attached to the studs to form the wall structure that provides an enclosed space for a tub or shower. Tiles, fiberglass structures, etc., are then attached to the drywall panels to provide a waterproof tub and/or shower area with an aesthetically pleasing appearance.

One feature that requires consideration during mounting is a projection dimension. The body member of the grab bar has a wall facing side and a front facing side that is opposite the wall facing side. The projection dimension of the grab bar, i.e. a gap between the wall facing side of the body member and a wall mount surface of the enclosure, must be tightly controlled to satisfy industry standards.

The grab bars must be positioned within the tub and shower areas such that they can be easily grabbed by individuals during ext or entry, for example. When positioning the grab bars on the wall of the enclosure, it would be ideal that the anchor assemblies be able to be aligned with one of the wall studs; however this is not always possible. In some mounting configurations only one of the anchor assemblies may be aligned with a stud, or sometimes, none of the anchor assemblies can be aligned with a stud.

Traditional anchor assemblies for these mounting configurations have presented some challenges. For example, when one end of the grab bar is mounted to a stud and the other end is mounted only to drywall, the projection dimension can be adversely affected at one end due to height variations between the two different mounting configurations.

Further, with traditional configurations, the anchor can fall behind the wall during installation. As such, the anchor cannot be removed and re-used if needed.

Thus, there is a need to provide an anchor assembly that can be used to easily mount a grab bar to a wall without adversely affecting the projection dimension for grab bars having different types of mounting structure. Further, the anchor assembly should not require any special tools, and should be configured to prevent mounting components from falling behind the wall during installation, as well as overcoming the other challenges presented by traditional designs discussed above.

SUMMARY OF THE INVENTION

A grab bar is attached to a bathroom structure, such as a wall of a shower enclosure or tub surround for example, in a non-stud mount configuration with at least one anchor assembly. The anchor assembly can be removed and repeatedly used as needed.

In one example, the anchor assembly includes a vertical support beam, a flange arm assembly, and a spring. The flange arm assembly has an arm portion and a base portion with a flange that fits against a wall surface. The flange prevents the flange arm assembly from falling behind the wall structure. The spring is attached to the vertical support beam and cooperates with the arm portion to hold the flange arm assembly in place during installation. The arm portion is received within a slot formed within the vertical support beam.

In one example, the arm portion has a non-circular cross-section. This configuration prevents the flange arm assembly from being able to rotate relative to the vertical support beam.

In one example, the spring comprises a spring body with spring edges that are received within grooves formed within the vertical support beam. The spring body is slid along the grooves until a spring tab, formed on the spring body between the spring edges, snaps into an opening in the vertical support beam to lock the spring in place. The spring includes curved surfaces that engage opposing sides of the arm portion to hold the flange arm assembly in place during installation.

One example assembly method includes the following steps. The flange arm assembly is coupled to the vertical support beam, and the flange arm assembly and vertical support beam are inserted through an opening in the wall surface. During insertion through the opening, the vertical support beam and flange arm assembly are in a generally horizontal position. Once inserted, the vertical support beam returns to a vertical position and the vertical support beam is rotated into an installation position. The base portion of the flange arm assembly can be gripped and rotated to rotate the vertical support beam into place. The flange of the flange arm assembly is engaged against the wall surface to prevent the base portion from falling through the opening and falling behind a wall structure that forms the wall surface. A fastener can then be inserted to secure the anchor assembly in place.

The subject anchor assembly for a grab bar provides an easily installed and re-usable configuration that does not adversely affect projection dimensions. These and other features of the present invention can be best understood from the following specification and drawings, the following of which is a brief description.

DETAILED DESCRIPTION OF THE PREFERRED EMBODIMENT

Figure 1:
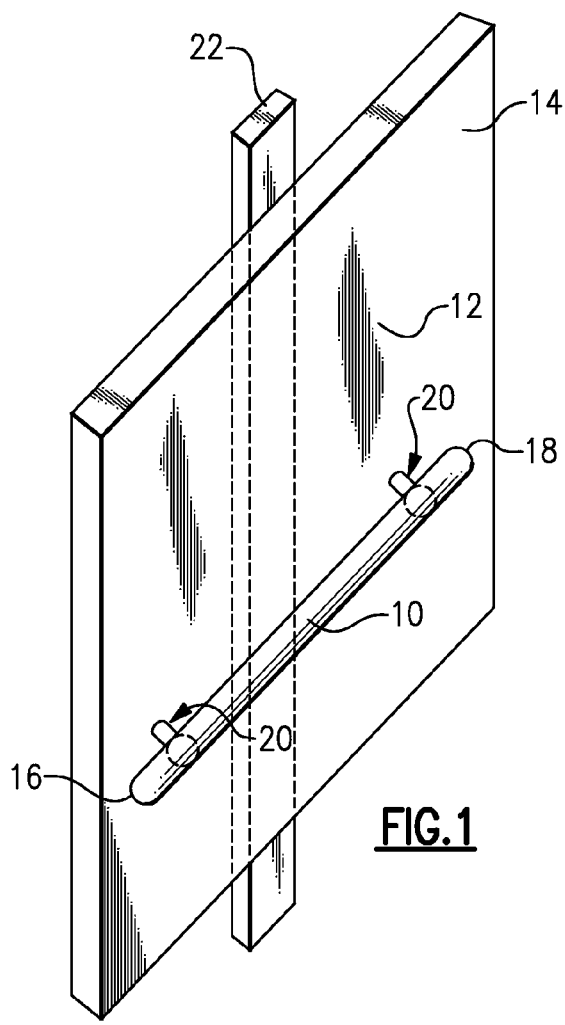
FIG. 1 is a schematic view of a wall stud, enclosure wall, grab bar, and mounting assembly.

FIG. 1 shows a grab bar 10 for attachment to a bathroom wall surface 12 of a wall structure 14, such as a tub surround/shower enclosure. The shower enclosure can be made from fiberglass or types of materials suitable for bathroom environments could also be used. The grab bar 10 extends between first 16 and second 18 ends. Mounting assemblies 20 are positioned near each of the first 16 and second 18 ends such that the grab bar 10 can be secured to the wall surface 12. In the example shown in FIG. 1, the grab bar 10 is a generally straight configuration; however, the grab bar 10 could include one or more angled portions or could have a non-linear configuration, such as an oval, triangular, or round shape for example. Further, while two mounting assemblies 20 are shown, it should be understood that a single mounting assembly could be used, or additional mounting assemblies could be used, depending upon the overall configuration of the grab bar.

In one example, the mounting assemblies 20 are not aligned with structural member spaced behind the wall structure 14, such as a wall stud 22. The mounting assemblies 20 are configured such that they can be used to secure the grab bar 10 to this "hollow" wall configuration. In some mounting configurations, one of the first 16 and second 18 ends could be aligned with the wall stud 22 while the other of the first 16 or second 18 ends is not aligned with a wall stud 22. The subject mounting assembly 20 provides an easy mount structure for a non-stud mount that does not vary a projection dimension when the grab bar 10 is installed with an opposite end being mounted to a wall stud 22.

Figure 2:
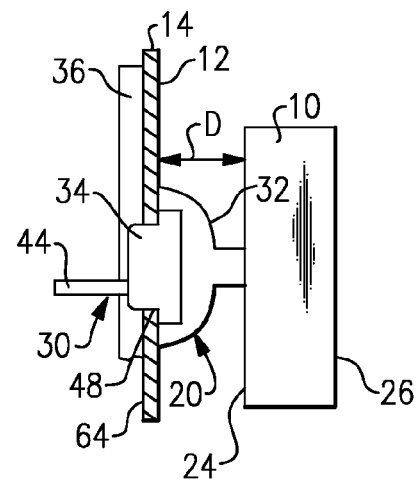
FIG. 2 is a schematic side view showing a projection dimension between an enclosure wall surface and a grab bar.

The grab bar 10 can be made from any of various types of body structures, such as hollow or solid body structures for example, and includes a wall facing side 24 (FIG. 2) and a front facing side 26 that is opposite the wall facing side 24. Each mounting assembly 20 is associated with the wall facing side 24 near the first 16 and second 18 ends as shown; however, the mounting assemblies 20 could be positioned at other locations on the grab bar body itself. When installed, the wall facing side 24 is spaced apart from the wall surface 12 by a projection dimension D as shown in FIG. 2. Industry standards require that this projection dimension D be set and maintained at a specified dimension.

Figure 3:
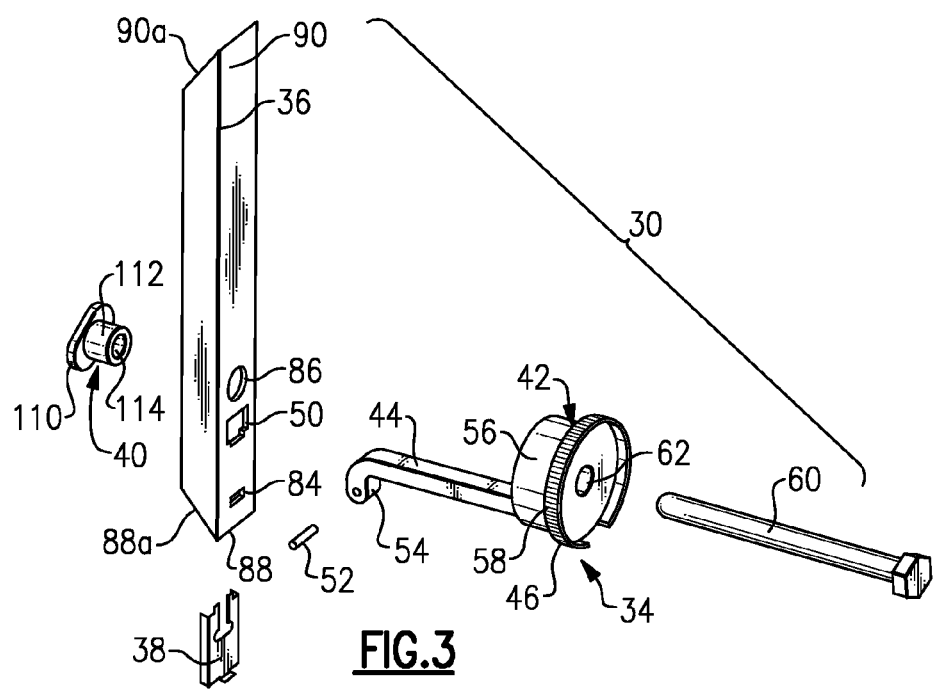
FIG. 3 is an exploded view of an anchor assembly.

The subject mounting assembly 20 includes an anchor assembly 30, shown in FIG. 3, which provides for easy, adjustable installation without special tools, in addition to providing the desired projection dimension D. The subject mounting assembly 20 also includes a base flange portion 32 that is associated with the grab bar 10 and which fits over the anchor assembly 30 as known. The anchor assembly 30 is configured such that the base flange portion 32 abuts against the wall surface 12 to maintain the projection dimension D.

In one example, the anchor assembly 30 includes a flange arm assembly 34, a vertical support beam 36, a spring 38, and a threaded insert 40. The vertical support beam 36 and flange arm assembly 34 are shown schematically in FIG. 2; and the entire anchor assembly 30 is shown in detail in FIG. 3.

The flange arm assembly 34 includes a base portion 42 that abuts against the wall surface 12 and an arm portion 44 that is received within the vertical support beam 36. In one example, the base portion 42 and the arm portion 44 are integrally formed together as a single-piece component. In one example, the single-piece component is made from a plastic material; however, other types of materials could also be used.

The base portion 42 has a flange 46 that has a diameter that is larger than a diameter of an opening 48 (FIG. 2) formed in the wall surface 12. In one example, the flange 46 is 4 mm thick and interfaces with a corresponding 4 mm bore formed within a back portion of the grab bar mount portion (not shown). By designing the grab bar to accommodate the full thickness of this flange 46, one anchor can be used, when stud mounting on an opposing end is possible, without changing the overall projection dimension D at either end.

The flange arm assembly 34 is fit through a slot 50 formed within the vertical support beam 36. In one example, the slot 50 comprises a T-shaped slot through which the arm portion 44 is inserted. A steel roll pin 52 connects the flange arm assembly 34 to the vertical support beam 36. In the example shown in FIG. 3, the arm portion 44 includes a downwardly extending distal end 54 that includes a hole for receiving the pin 52. The pin 52 prevents the arm portion 44 from being pulled out of the vertical support beam 36.

As discussed above, the flange 46 of the base portion 42 is sized such that it is larger than the opening 48 in the wall surface 12. The base portion 42 increases slightly in diameter from a forward face as the diameter approaches a mounting surface at a rear of the flange 46. This creates a slight frictional fit between the anchor assembly 30 and the wall structure 14 to ensure vertical orientation of the anchor assembly 30 during the installation phase. Directly behind the flange 46 is a reduced diameter portion 56 that closely matches the diameter of the opening 48 in the wall surface 12. The purpose of this reduced diameter portion 56 is to distribute any downward forces exerted on the grab bar 10 over as large an area as possible.

The outer peripheral surface 58 of the flange 46 comprises a knurled or textured surface. This surface facilitates rotation of the entire anchor assembly 30 when needed. This will be discussed in greater detail below.

Figure 7A:
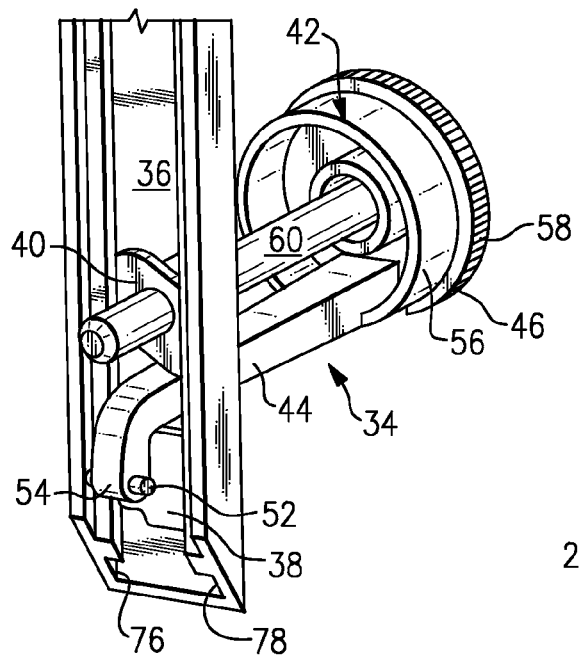
FIG. 7A is a perspective assembled view, as seen from the rear, of one example of the anchor assembly of FIG. 3.
Figure 7B:
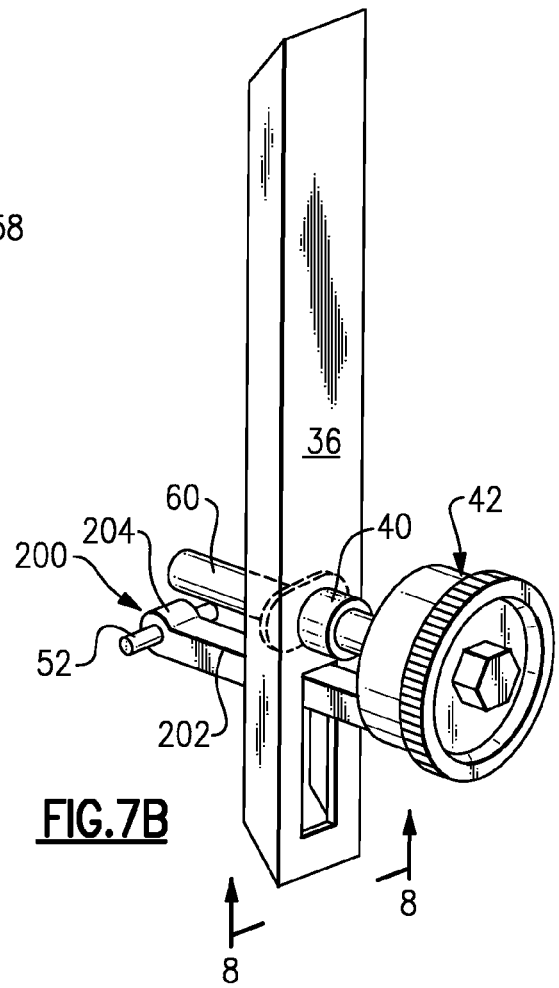
FIG. 7B is a perspective assembled view, as seen from the front, of a similar anchor assembly with another example of a flange arm assembly.

Another example of a flange arm assembly 200 is shown in FIG. 7B. Instead of providing an arm portion 44 with a downwardly extending distal end 54, the arm portion 202 is substantially straight and includes a boss 204 with a hole to receive the pin 52. The remaining portion of the flange assembly 200 is similar to that described above.

The anchor assembly 30 also includes a fastener 60 that is inserted through an opening 62 in the base portion 42 of the flange arm assembly 34, and which is threaded into the threaded insert 40. The fastener 60 cooperates with the threaded insert 40, vertical support beam 36, and flange arm assembly 34 to pull the vertical support beam 36 against a rear surface 64 (FIG. 2) of the wall structure 14. This will be discussed in greater detail below.

Figure 4:
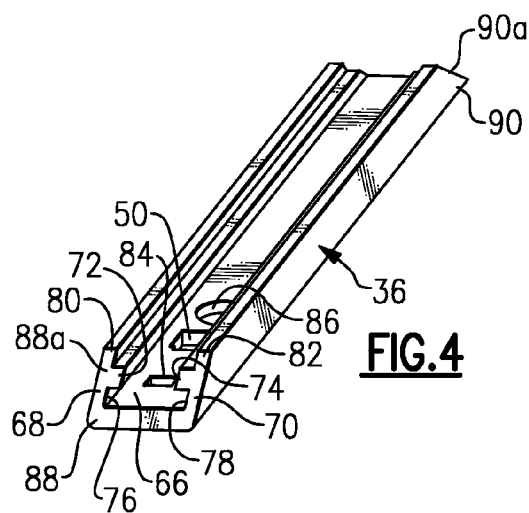
FIG. 4 is a perspective view of a vertical support beam for the anchor assembly.
Figure 5:
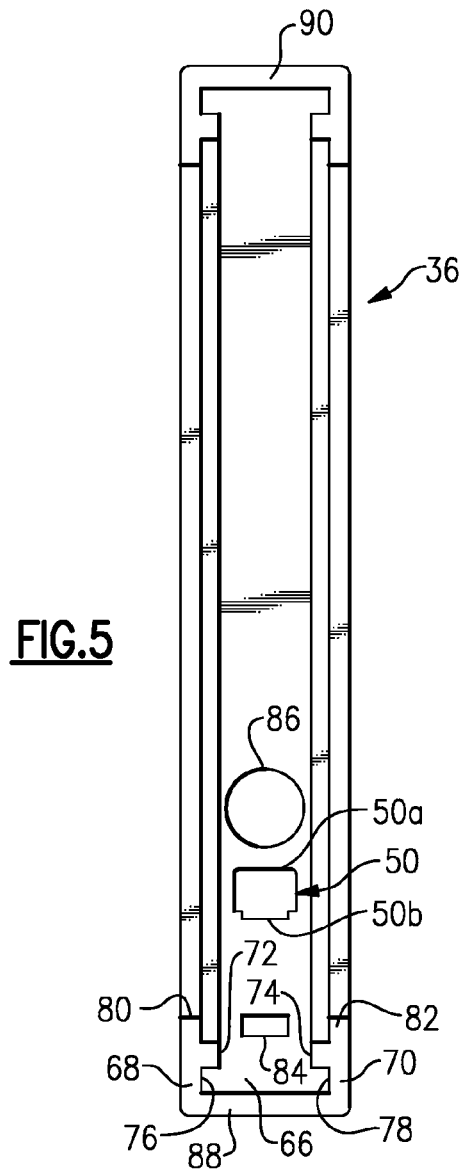
FIG. 5 is a front view of the vertical support beam of FIG. 4.

The vertical support beam 36 is shown in greater detail in FIGS. 4 and 5. In one example, the vertical support beam 36 is formed as an extruded component from a suitable aluminum material; however, other materials and forming processes could also be used. The vertical support beam 36 comprises a C-channel having a base portion 66 and first 68 and second 70 legs extending outwardly from opposing edges of the base portion 66 to form the C-shape. A first rib 72 extends inwardly from an inner wall surface of the first leg 68 and a second rib 74 extends inwardly from an inner wall surface of the second leg 70. The first 72 and second 74 ribs extend inwardly toward each other and are separated by a gap. A first groove 76 is formed between the base portion 66 and the first rib 72 and a second groove 78 is formed between the base portion 66 and the second rib 74.

A first rib or protrusion 80 is formed on an end of the first leg 68 that extends outwardly beyond the first rib 72. A second rib or protrusion 82 is formed on an end of the second leg 70 that extends outwardly beyond the second rib 74. The first 80 and second 82 protrusions extend in a direction that is generally common with the first 68 and second 70 legs. The first 80 and second 82 protrusions increase the overall strength of the vertical support beam 36 and ensure that allowable limits of the material are not exceeded under normal use.

The base portion 66 of the vertical support beam 36 includes the slot 50 that receives the arm portion 44 of the flange arm assembly 34. As shown in FIG. 5, this slot 50 has a T-shape comprising a widened portion 50a and a narrowed portion 50b. This shape facilitates insertion and retention of the arm portion 44 within the vertical support beam 36. Further, in one example, the arm portion 44 is comprised of a non-circular cross-section, which prevents the flange arm assembly 34 from being able to rotate relative to the vertical support beam 36 during installation.

The base portion 66 of the vertical support beam 36 also includes a spring slot 84 used to lock the spring 38 in place on the vertical support beam 36. In the example shown, the spring slot 84 is rectangular in shape; however, other shapes could be used.

The base portion 66 also includes an opening 86 to receive the threaded insert 40. In the example shown, the opening 86 comprises a circular opening; however, other shapes could also be used.

The vertical support beam 36 extends from a first end 88 to a second end 90. The slot 50 for the arm portion 44, the spring slot 84, and the opening 86 for the threaded insert 40 are located near the first end 88. In the example shown, the spring slot 84 is positioned on one side of the slot 50 for the arm portion 44, and the opening 86 for the threaded insert 40 is positioned on an opposite side of the slot 50.

The first 88 and second 90 ends of the vertical support beam 36 include first 88a and second 90a tapered surfaces. This minimizes the profile height of the vertical support beam 36 when it is inserted through the opening 48 in the wall surface 12. It should be understood that while tapered surfaces are shown, rounded ends or other types of reduced area end portions could also be used.

Figure 6:
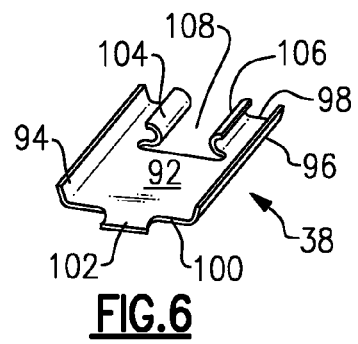
FIG. 6 is a perspective view of a spring for the anchor assembly.

The spring 38 is shown in greater detail in FIG. 6. In one example, the spring 38 is made from sheet metal; however, other suitable materials could also be used. The spring 38 comprises a generally flat spring body 92 with first 94 and second 96 upwardly turned edges or seams that extend along opposing sides of the spring body 92. The first 94 and second 96 upwardly turned edges are slidably received within the first 76 and second 78 grooves of the vertical support beam 36. An upper edge 98 extends along the spring body 92 between the first 94 and second 96 upwardly turned edges and a lower edge 100 extends along the spring body 92 between the first 94 and second 96 upwardly turned edges.

A lock tab 102 is formed along the lower edge 100. The lock tab 102 extends at an oblique angle relative to the spring body 92. The spring body 92 is slid along the first 76 and second 78 grooves until the lock tab 102 snaps into the spring slot 84 of the vertical support beam 36. This securely locks the spring 38 in position on the vertical support beam 36. The spring 38 is also held in position on an opposite end by the insertion of the threaded insert 40.

The threaded insert 40 includes a base portion 110 (FIG. 3) and a post portion 112 that extends outwardly from the base portion 110. The post portion 112 includes a threaded opening 114 that receives the fastener 60. The threaded insert 40 is installed through the open channel of the vertical support beam 36, and the post portion 112 is inserted through the opening 86. The base portion 110 is formed with a slight eccentric, i.e. the base portion 110 is non-circular. When the threaded insert 40 is installed and rotated into place, the eccentric allows the insert 40 to lock into place by engagement with wall surfaces of the grooves 76, 78 of the vertical support beam 36.

Figure 8:
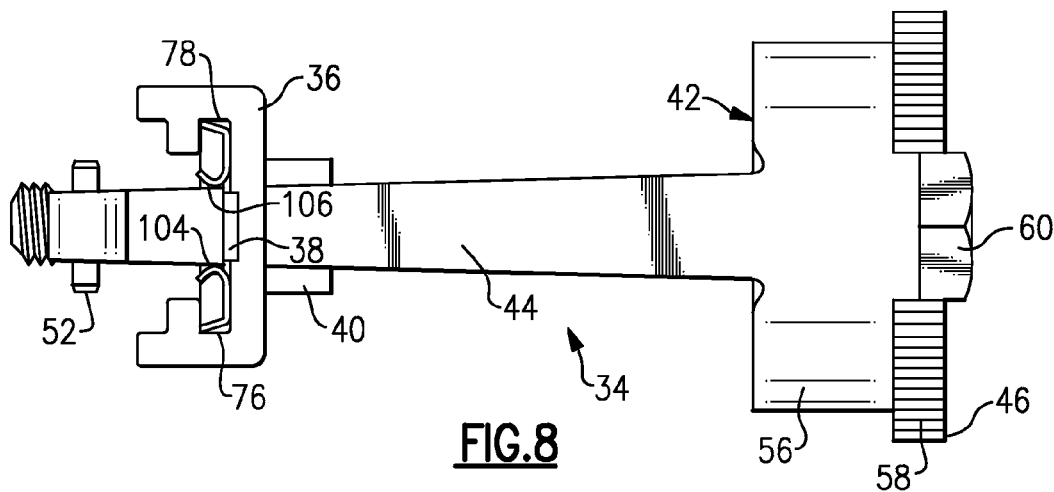
FIG. 8 is a bottom view of the flange arm assembly, vertical support beam, and spring.

The spring 38 serves as a movable and re-usable retention device. This is accomplished primarily by first 104 and second 106 curved surfaces that hold the flange arm assembly 34 from movement by exerted spring pressure. A slot 108 is formed within the upper edge 98 of the spring body 92. The first 104 and second 106 curved surfaces extend along opposing edges of the slot 108, and are spaced inwardly of the first 94 and second 96 upwardly turned edges. The arm portion 44 is received within the slot 108 such that the first 104 and second 106 curved surfaces engage opposing sides of the arm portion 44 to hold the arm portion 44 in place, as shown in FIG. 8.

Installation of the anchor assembly 30 will be discussed with reference to FIGS. 7A and 7B. The flange arm assembly 34 and the spring 38 are secured to the vertical support beam 36 as described above. The post portion 112 of the threaded insert 40 is inserted into the opening 86 and is rotated until the eccentricity of the base portion 110 locks the threaded insert into place on the vertical support beam 36. Thus, an assembly of the vertical support beam 36, the spring 38, the threaded insert 40, and the flange arm assembly 34 is provided.

To install this assembly through the opening 48 in the wall surface 12, the vertical support beam 36 is orientated in a generally horizontal position with the flange arm assembly 34 lying flat against the vertical support beam 36. This flattened assembly is then pushed through the opening 48 in the wall surface 12. Once the vertical support beam 36 is fully through the opening 48, with the flange 46 of the flange arm assembly 34 located on an opposite side of the wall structure 14 from the vertical support beam 36, the vertical support beam 36 returns to a vertical orientation. The knurled surface of the flange 46 is gripped and rotated, which correspondingly rotates the entire assembly. The entire assembly is rotated until the second end 90 of the vertical support beam 36 is positioned vertically above the first end 88.

The fastener 60 is inserted through the opening 62 in the base portion 42 of the flange arm assembly 34 and is threaded into the opening 114 of the post portion 112. The threaded engagement draws the vertical support beam 36 support beam securely against the wall structure 14. Once the anchor assembly 30 is securely and properly installed, grab bar end mounts can be fit over the flange 46 and the grab bar 10 can be secured in place with set screws as known.

The subject anchor assembly 30 is configured to be non-permanent, i.e. the anchor assembly 30 can be removed and re-used as needed. This is an advantage over prior designs which had major components fall behind the wall structure once the attachment fastener and/or flange assembly was removed. Due to the use of the flange 46, which abuts against the wall surface 12, in combination with the spring 38, the anchor assembly 30 is easily removed. To remove the anchor assembly 30, the fastener 60 is removed, which allows the base portion 42 of the flange arm assembly 34 to be pulled away from the wall surface 12. This releases the spring retention pressure and allows the vertical support beam 36 to lay flat. With the vertical support beam 36 in this position, pulling the flange arm assembly 34 further forward, further collapses the assembly to reduce the profile height such that the vertical support beam 36 can follow right behind the flange arm assembly 34 through the opening 48.

Further, the flange height of the flange 46 is configured such that it is recessed behind the grab bar mount flange. As such, the anchor assembly 30 does not add any height to the overall projection of the grab bar 10, which is a significant improvement compared to prior designs.

Also, the recessed flange feature minimizes costs to the end user. The recessed flange feature allows stud mounting on one side and anchor mounting on the other side, which allows the end user to purchase only one anchor assembly. A less expensive lag screw mount can be used for the stud mounting end. With prior designs, the different mount schemes at each end resulted in different projection dimensions at each end.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An anchor assembly for a bathroom grab bar comprising:
a vertical support beam having a slot, said vertical support beam comprising a single-piece component that is configured to be insertable through an opening in a wall surface;
a flange arm assembly including a base portion and an arm portion that is non-rotatable relative to said vertical support beam, said base portion to interface with the wall surface and said arm portion being received within said slot, and wherein said base portion comprises a flange having a diameter that is configured to be larger than a diameter of the opening in the wall surface to prevent the base portion from falling through the opening; and
a spring that engages opposing sides of said arm portion, wherein said spring is supported by said vertical support beam such that said spring cooperates with said arm portion to hold the anchor assembly in place during assembly.

2. The anchor assembly according to claim 1 wherein said arm portion has a non-circular cross-section such that said arm portion cannot rotate relative to said vertical support beam.

3. The anchor assembly according to claim 1 wherein said slot has a T-shape.

4. The anchor assembly according to claim 1 wherein an outer peripheral surface of said flange comprises a knurled surface.

5. The anchor assembly according to claim 1 including a fastener that extends through an opening in the base portion.

6. The anchor assembly according to claim 5 including a threaded insert comprising a base portion and a post portion having an opening that receives said fastener, said base portion in locking engagement with vertical wall surfaces of said vertical support beam to prevent said insert from rotating relative to said vertical support beam.

7. The anchor assembly according to claim 1 wherein said single-piece component comprises an extruded component.

8. An anchor assembly for a bathroom grab bar comprising:
a vertical support beam having a slot, said vertical support beam comprising a single-piece component that is configured to be insertable through an opening in a wall surface;
a flange arm assembly including a base portion and an arm portion that is non-rotatable relative to said vertical support beam, said base portion to interface with the wall surface and said arm portion being received within said slot, and wherein said base portion comprises a flange having a diameter that is configured to be larger than a diameter of the opening in the wall surface to prevent the base portion from falling through the opening, and wherein said flange arm assembly is coupled to said vertical support beam with a pin; and
a spring supported by said vertical support beam such that said spring cooperates with said arm portion to hold the anchor assembly in place during assembly.

9. An anchor assembly for a bathroom grab bar comprising:
a vertical support beam having a slot, said vertical support beam comprising a single-piece component that is configured to be insertable through an opening in a wall surface, and wherein said vertical support beam includes a first end and a second end, said slot being formed adjacent said first end;
a flange arm assembly including a base portion and an arm portion that is non-rotatable relative to said vertical support beam, said base portion to interface with the wall surface and said arm portion being received within said slot, and wherein said base portion comprises a flange having a diameter that is configured to be larger than a diameter of the opening in the wall surface to prevent the base portion from falling through the opening, and wherein said vertical support beam is movable between an initial installation position where said arm portion and said vertical support beam assume a generally horizontal position during insertion through the opening in the wall surface and a final installation position where said second end of said vertical support beam extends in a vertical direction upwardly away from the opening in the wall surface; and
a spring supported by said vertical support beam such that said spring cooperates with said arm portion to hold the anchor assembly in place during assembly.

10. The anchor assembly according to claim 9 wherein end surfaces of the first and second ends of the vertical support beam comprise tapered surfaces.

11. An anchor assembly for a bathroom grab bar comprising:
a vertical support beam having a slot, said vertical support beam being insertable through an opening in a wall surface, wherein said vertical support beam comprises a C-channel having a base portion with first and second legs extending outwardly away from opposing edges of said base portion, and including a first rib extending inwardly from said first leg and a second rib extending inwardly from said second leg such that first and second grooves are respectively formed between said first and second ribs and said base portion;
a flange arm assembly including a base portion and an arm portion, said base portion to interface with the wall surface and said arm portion being received within said slot, and wherein said base portion comprises a flange having a diameter that is configured to be larger than a diameter of the opening in the wall surface to prevent the base portion from falling through the opening; and
a spring supported by said vertical support beam such that said spring cooperates with said arm portion to hold the anchor assembly in place during assembly, and wherein said spring is received within said first and said second grooves.

12. The anchor assembly according to claim 11 wherein said spring comprises a generally flat spring body with first and second upwardly turned edges formed at opposing edges of said spring body, said first and second upwardly turned edges being slidably received within said first and second grooves.

13. The anchor assembly according to claim 12 wherein said spring includes an angled tab portion located on said spring body at a position between said first and second upwardly turned edges, said angled tab portion being received within a spring slot formed within said vertical support beam to hold said spring fixed relative to said vertical support beam.

14. The anchor assembly according to claim 13 wherein said spring includes first and second curved surfaces that engage opposing surfaces of said arm portion.

15. The anchor assembly according to claim 11 including a threaded insert having an eccentric base portion and a post portion with a threaded opening, said eccentric base portion being in gripping engagement with walls of said first and second grooves to prevent said threaded insert from rotating relative to said vertical support beam, and said post portion being inserted through an insert opening formed within said vertical support beam.

16. The anchor assembly according to claim 15 including a fastener that is inserted through an opening in said base portion of said flange arm assembly and threaded into said threaded opening of said post portion such that said fastener is capable of pulling said vertical support beam against a wall structure that provides the wall surface.

17. An anchor assembly for a bathroom grab bar comprising:

a vertical support beam having a slot, said vertical support beam comprising a single-piece component that is configured to be insertable through an opening in a wall surface;

a flange arm assembly including a base portion and an arm portion that is non-rotatable relative to said vertical support beam, said base portion to interface with the wall surface and said arm portion being received within said slot, and wherein said base portion comprises a flange having a diameter that is configured to be larger than a diameter of the opening in the wall surface to prevent the base portion from falling through the opening;

a spring supported by said vertical support beam such that said spring cooperates with said arm portion to hold the anchor assembly in place during assembly, and wherein said spring comprises a flat spring slidable along said vertical support beam into a locked position; and a fastener that extends through an opening in the base portion.

18. The anchor assembly according to claim 17 wherein said vertical support beam includes an opening to receive said fastener and a spring slot separate from said opening, said spring slot receiving a locking portion of said flat spring, and wherein said opening is separate from said slot that receives said arm portion.

* * * * *